US010635801B2

(12) United States Patent
Tovey et al.

(10) Patent No.: US 10,635,801 B2
(45) Date of Patent: Apr. 28, 2020

(54) SYSTEMS AND METHODS FOR SECURING ACCESS TO STORAGE AND RETRIEVAL SYSTEMS

(71) Applicant: Walmart Apollo, LLC, Bentonville, AR (US)

(72) Inventors: David G. Tovey, Rogers, AR (US); John J. O'Brien, Farmington, AR (US); Bruce W. Wilkinson, Rogers, AR (US); Brian G. McHale, Chadderton Oldham (GB); Robert L. Cantrell, Herndon, VA (US); Donald R. High, Noel, MO (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/167,121

(22) Filed: Oct. 22, 2018

(65) Prior Publication Data

US 2019/0130086 A1    May 2, 2019

Related U.S. Application Data

(60) Provisional application No. 62/578,639, filed on Oct. 30, 2017.

(51) Int. Cl.
*G06F 21/32*    (2013.01)
*G06F 21/31*    (2013.01)
(Continued)

(52) U.S. Cl.
CPC ............ *G06F 21/32* (2013.01); *G06F 21/316* (2013.01); *G06F 21/35* (2013.01); *G07C 9/26* (2020.01);
(Continued)

(58) Field of Classification Search
CPC ........ G06F 21/32; G06F 21/35; G06F 21/316; G06F 2221/2111; G07C 9/00087;
(Continued)

(56) References Cited

U.S. PATENT DOCUMENTS

| 6,769,611 B2 | 8/2004 | Miller |
| 9,759,570 B2 | 9/2017 | Joao |

(Continued)

FOREIGN PATENT DOCUMENTS

| WO | 2016032567 | 3/2016 |
| WO | 2016105265 | 6/2016 |

OTHER PUBLICATIONS

PCT; App. No. PCT/US2018/057724; International Search Report and Written Opinion dated Jan. 16, 2019.

(Continued)

*Primary Examiner* — Daniell L Negron
(74) *Attorney, Agent, or Firm* — Fitch, Even, Tabin & Flannery LLP

(57) ABSTRACT

In some embodiments, apparatuses and methods are provided herein useful to secure access. In some embodiments, there is provided a system for securing access using decentralized biometric authentication data through a blockchain network including: a user interface product operable on a user device and configured to: receive a first one or more biometric data; receive near real-time location data associated with the first one or more biometric data; receive a token comprising a second one or more biometric data; determine whether the first one or more biometric data matches within a threshold with the second one or more biometric data; determine whether the first one or more biometric data and the second one or more biometric data are associated with the user device; determine whether the near real-time location data is within a threshold distance from a (Continued)

storage and retrieval system (SRS); and provide data associated with unlocking the SRS.

20 Claims, 10 Drawing Sheets

(51) Int. Cl.

| | | |
|---|---|---|
| G06F 21/35 | (2013.01) | |
| H04L 29/06 | (2006.01) | |
| H04W 4/029 | (2018.01) | |
| H04L 9/32 | (2006.01) | |
| H04L 9/06 | (2006.01) | |
| G07C 9/37 | (2020.01) | |
| G07C 9/25 | (2020.01) | |
| H04W 4/80 | (2018.01) | |
| H04W 4/44 | (2018.01) | |
| G07C 9/26 | (2020.01) | |

(52) U.S. Cl.
CPC .............. *G07C 9/37* (2020.01); *H04L 9/0637* (2013.01); *H04L 9/3213* (2013.01); *H04L 9/3231* (2013.01); *H04L 9/3239* (2013.01); *H04L 9/3247* (2013.01); *H04L 9/3297* (2013.01); *H04L 63/0853* (2013.01); *H04L 63/0876* (2013.01); *H04L 63/107* (2013.01); *H04W 4/029* (2018.02); *G06F 2221/2111* (2013.01); *H04L 2209/38* (2013.01); *H04L 2209/80* (2013.01); *H04W 4/44* (2018.02); *H04W 4/80* (2018.02)

(58) Field of Classification Search
CPC ...... G07C 9/00158; G07C 2009/00095; H04L 9/0637; H04L 9/3231; H04L 9/3213; H04L 63/0876; H04L 63/0853; H04L 63/107; H04L 2209/80; H04L 2209/38; H04L 9/3236; H04W 4/029; H04W 4/80; H04W 4/44
See application file for complete search history.

(56) References Cited

U.S. PATENT DOCUMENTS

| | | |
|---|---|---|
| 2012/0158606 A1 | 6/2012 | Moudy |
| 2012/0246077 A1 | 9/2012 | Skaaksrud |
| 2014/0330407 A1 | 11/2014 | Corder |
| 2015/0058163 A1 | 2/2015 | Lenahan |
| 2015/0106291 A1 | 4/2015 | Robinson |
| 2015/0112887 A1 | 4/2015 | Camp |
| 2015/0254446 A1 | 9/2015 | Lacous |
| 2016/0162897 A1 | 6/2016 | Feeney |
| 2016/0205096 A1 | 7/2016 | Hoyos |
| 2016/0321654 A1 | 11/2016 | Lesavich |
| 2016/0335822 A1 | 11/2016 | Ogishi |
| 2017/0147975 A1 | 5/2017 | Natarajan |
| 2017/0250972 A1 | 8/2017 | Ronda |

OTHER PUBLICATIONS

Bradford Systems; "Smart Lockers"; http://bradfordsystems.com/lockers/tz-intelligent-lockers; Available at least as early as Sep. 6, 2017; pp. 1-4.
Callahan, John; "Blockchain & Biometrics: The Future of Identity"; https://www.veridiumid.com/blog/future-identity-blockchain-biometrics; Published on May 25, 2017; pp. 1-4.
Cjentzsch; "Slockit/Smart-Contract"; https://github.com/slockit/smart-contract/blob/6d94cfa32a67f42d414d821e97d6798f02b7a131/Token.sol; Published on Dec. 29, 2015; pp. 1-3.
Dr. Y; "An Ethereum Contract Analyzer"; https://blog.slock.it/an-ethereum-contract-analyzer-93e9da92fecb; Published on Jan. 12, 2016; pp. 1-6.
HYPR; "Biometric Locks Powered by FIDO Security"; https://www.hypr.com/biometric-locks; Available at least as early as Sep. 19, 2017; pp. 1-7.
HYPR; "Bitcoin Biometrics & Blockchain Security"; https://www.hypr.com/biometric-bitcoin-blockchain; Available at least as early as Sep. 19, 2017; pp. 1-8.
HYPR; "HYPR Corp. Launches Industry First Biometric Tokenization Platform"; https://www.prnewswire.com/news-releases/hypr-corp-launches-industry-first-biometric-tokenization-platform-300116025.html; Published on Jul. 21, 2015; pp. 1-4.
HYPR; "IoT Authentication"; https://www.hypr.com/iot-authentication; Available at least as early as Sep. 19, 2017; pp. 1-4.
IPI Singapore; "Hyperledger-based Open Logistics Platform for Last-Mile Fulfillment"; https://www.ipi-singapore.org/technology-offers/hyperledger-based-open-logistics-platform-last-mile-fulfillment; Published on Jun. 22, 2017; pp. 1-3.
Moinet, Axel et al.; "Blockchain based trust & authentication for decentralized sensor networks"; https://www.researchgate.net/publication/317377712_Blockchain_based_trust_authentication_for_decentralized_sensor_networks; Available at least as early as Jun. 23, 2017; pp. 1-7.
NEC Corporation; "Seamless airport gate solution using biometric authentication [NEC official]"; https://www.youtube.com/watch?v=NHnVV0Wqiws; Published on Jan. 26, 2016; pp. 1-5.
PYMNTS; "Biometrics Meets Blockchain"; https://www.pymnts.com/news/blockchain-distributed-ledger/2016/biometrics-meets-blockchain; Published on Mar. 2, 2016; pp. 1-7.
Slock.It; "The Ethereum Computer"; https://slock.it/ethereum_computer.html; Available at least as early as Jul. 3, 2017; pp. 1-6.
Wikipedia; "Biometric Tokenization"; https://en.wikipedia.org/wiki/Biometric_Tokenization; Available at least as early as Sep. 19, 2017; pp. 1-4.

400

402 determine a first identification data associated with a user device 404 determine whether the first identification data matches with a second identification data 406 provide to an SRS a second data indicating that the first identification data matches with the second identification data

FIG. 4

SYSTEMS AND METHODS FOR SECURING ACCESS TO STORAGE AND RETRIEVAL SYSTEMS

CROSS-REFERENCE TO RELATED APPLICATION

This application claims the benefit of U.S. Provisional Application No. 62/578,639, filed Oct. 30, 2017, which is incorporated herein by reference in its entirety.

TECHNICAL FIELD

This invention relates generally to securing access to retail products in storage and retrieval systems.

BACKGROUND

Generally, after a receipt of an order for a delivery of an item from a customer, a retailer, a manufacturer, or an order processing agent or associate prints out a label that includes a destination address of a place to deliver the item and an intended recipient. The label is then placed on a box storing the item. Generally, the box is left at the destination address and with an assumption that a person who will access the box to retrieve the item is the intended recipient that is authorized by the customer to receive the item.

BRIEF DESCRIPTION OF THE DRAWINGS

Disclosed herein are embodiments of systems, apparatuses and methods pertaining to securing access to storage and retrieval systems through a blockchain network. This description includes drawings, wherein:

FIG. 4 shows a flow diagram of an exemplary process of securing access to storage and retrieval systems using decentralized biometric authentication data in accordance with some embodiments;

Figure 1:
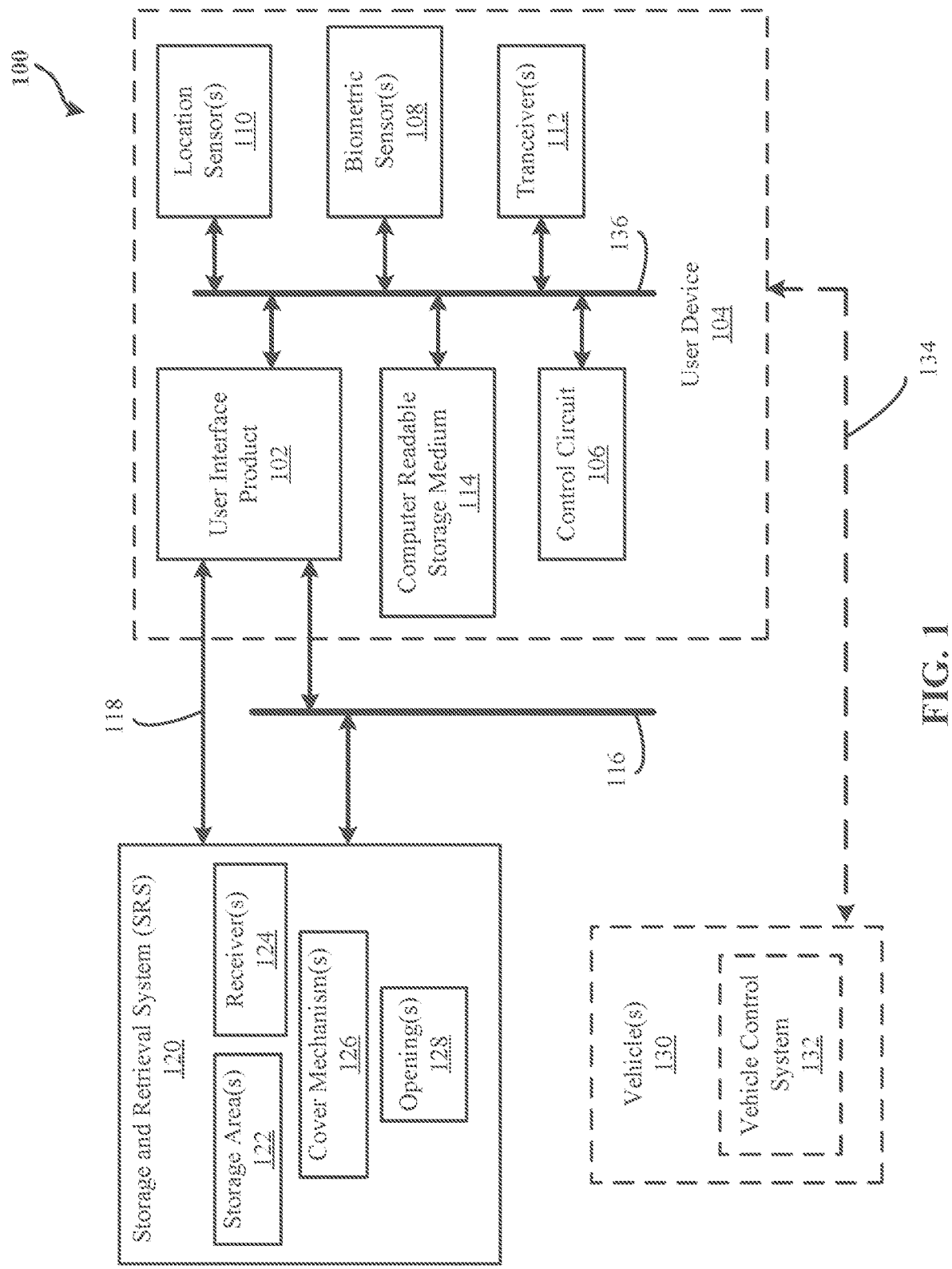
FIG. 1 illustrates a simplified block diagram of an exemplary system for securing access to storage and retrieval systems using decentralized biometric authentication data in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for securing access to storage and retrieval systems using decentralized biometric authentication data. In some embodiments, there is a system for securing access to storage and retrieval systems using decentralized biometric authentication data through a blockchain network including a user interface product. The user interface product may be operable on a user device coupled to the blockchain network. The user device may include one or more biometric sensors, at least one location sensor, a transceiver, and/or a control circuit operatively coupled to the user interface product. The user interface product is adapted to enhance decentralized biometric authentication through the blockchain network by being configured to: receive, at a first time, from the one or more biometric sensors a first one or more biometric data of a user associated with the user device. By one approach, the user interface product may receive, at the first time, from the at least one location sensor near real-time location data associated with the first one or more biometric data. The user interface product may receive, via the transceiver, from at least one computer server coupled to the blockchain network a token comprising a second one or more biometric data of the user. In one configuration, the user interface product may determine cooperatively with the control circuit, at the first time, whether the first one or more biometric data matches within a threshold with the second one or more biometric data. In another configuration, the user interface product may determine cooperatively with the control circuit, at the first time, whether the first one or more biometric data and the second one or more biometric data are associated with the user device. By one approach, the user interface product may determine cooperatively with the control circuit, at the first time, whether the near real-time location data received from the at least one location sensor is within a threshold distance from a storage and retrieval system (SRS) associated with the user. In yet another approach, the user interface product may provide, at the first time via the transceiver, data associated with unlocking the SRS based on the determination that: the first one or more biometric data matches within the threshold with the second one or more biometric data; the near real-time location data is within the threshold distance from the SRS; and the first one or more biometric data and the second one or more biometric data are associated with the user device. In one configuration, the system may include the SRS. The SRS may be operatively coupled to the user device. By one approach, the SRS may comprise an opening to a storage area adapted to receive one or more items for delivery. By another approach, the SRS may include a cover mechanism to prevent access to the opening. By yet another approach, the SRS may include a receiver configured to receive the data associated with unlocking the SRS via a release of the cover mechanism.

In some embodiment, there is provided a computer program product embodied on a computer readable storage medium for enhancing decentralized biometric authentication through the blockchain network. The computer program product includes computer code for receiving from one or more biometric sensors a first one or more biometric data of a user associated with a user device. In one configuration, the user device may include the computer readable storage medium. By one approach, the computer program product may include computer code for receiving from at least one location sensor associated with the user device near real-time location data associated with the first one or more biometric data. The computer program product may include computer code for receiving from at least one computer server coupled to a blockchain network a token including a second one or more biometric data of the user. By another approach, the computer program product may include computer code for determining whether the first one or more biometric data matches with the second one or more biometric data. In one configuration, the computer program product may include computer code for determining whether the first one or more biometric data and the second one or more biometric data are associated with the user device. In another configuration, the computer program product may include computer code for determining whether the near real-time location data received from the at least one location sensor is within a threshold distance from a storage and retrieval system (SRS) associated with the user. In yet another configuration, the computer program product may include computer code for determining that: the first one or more biometric data matches with the second one or more biometric data; the near real-time location data is within the threshold distance from the SRS; and the first one or more biometric data and the second one or more biometric data are associated with the user device. By one approach, the computer program product may include computer code for providing data associated with unlocking the SRS based on the determination that: the first one or more biometric data matches with the second one or more biometric data; the near real-time location data is within the threshold distance from the SRS; and the first one or more biometric data and the second one or more biometric data are associated with the user device.

FIG. 1 illustrates a simplified block diagram of an exemplary system 100 that secures access to storage and retrieval systems using decentralized biometric authentication data in accordance with some embodiments. The system 100 includes a user interface product 102. By one approach, the user interface product 102 may be operable on a user device 104. By another approach, the user interface product 102 may operate as a stand-alone device capable of performing and/or executing functions described herein. As such, functions described herein of the user interface product 102 being operable on the user device 104 may equally be applicable to the user interface product 102 operating as a stand-alone device. In one configuration, the user interface product 102 and/or the user device 104 may be coupled to a blockchain network 116. By one approach, the user device 104 may include one or more biometric sensors 108, at least one location sensor 110, a transceiver 112, and a control circuit 106 that are operatively coupled to the user interface product 102. By another approach, the control circuit 106 may instead be included with the user interface product 102. In one configuration, the control circuit 106 may be operatively coupled via one or more communication buses 136. In another configuration, the transceiver 112 may comprise a receiver, a transmitter, or a device including both the receiver and/or the transmitter configured to receive wired and/or wireless data from the blockchain network 116 and/or a storage and retrieval system (SRS) 120. In one example, the wired and/or wireless data may be based on one or more IEEE wired and wireless communication standards (e.g., local area network, Ethernet, WI-FI, Bluetooth wireless communication, among other such IEEE communication standards). In another example, the wired and/or wireless data may be based on a proprietary wired and wireless communication protocols. In another configuration, the one or more biometric sensors 108 may include one or more devices that change one or more biometric traits of a person into electrical signal and/or digital data. The biometric traits (or biometric data) may include facial, fingerprint, hand, iris, DNA, keystroke, signature, voice, stride, posture, gait, subconscious movements and mannerisms, among other types of biometric traits/characteristics of a person. In another configuration, the at least one location sensor 110 may include a global positioning system (GPS), and/or other types of devices configured to determine a near real-time location of a device, such as the user device 104. The device or the user device 104 may include a smartphone, a smart watch, a laptop, any smart devices, a server, a computer, among other electronic products capable of processing data.

In some embodiments, the system 100 may include one or more computer readable storage mediums 114. The computer readable storage medium 114 may include a random access memory (RAM), a read only memory (ROM), a cache memory, a hard disk, an optical disk, a USB drive, among other types of storage devices capable of storing electronic data. By one approach, the user interface product 102 may cooperatively operate with the control circuit 106 in conjunction with the computer readable storage medium 114. In one configuration, the user interface product 102 may be integrated with the user device 104. In another configuration, the user interface product 102 may be detachably coupled to the user device 104. In such a configuration, the user interface product 102, for example, may include the computer readable storage medium 114. In another such configuration, the user interface product 102, for example, may be communicatively coupled to the computer readable storage medium 114 that may be integrated with the user device 104.

In some embodiments, the SRS 120 may include one or more openings 128 to one or more storage areas 122 that are adapted to receive one or more items for delivery. By one approach, the SRS 120 may include one or more doors or other cover mechanisms 126 with one or more locking systems controlled to prevent and allow access to the storage areas 122 through the one or more openings 128 depending on a determined access authorization. By another approach, the SRS 120 may include a wired and/or wireless communication receiver 124 configured to receive data associated with unlocking one or more cover mechanisms 126 of the SRS 120 via a release of the locking system of one or more cover mechanisms 126. In one example, each of the storage areas 122 may be at least temporarily associated with a customer order and/or a customer. The items received by each of the storage areas 122 may be secured from access through at least one of the openings 128. In one configuration, at least one of the openings 128 are locked and/or unlocked based on authentication implemented at least in part through the user interface product 102. At least a lock signal and/or an unlock signal may be communicated to the SRS 120 via the blockchain network 116 and/or a wireless network 118. In one example, the wireless network 118 may include a local wireless network, a peer-to-peer network, and/or other type of networks that is configured to provide local and/or secure communications between the user interface product 102 and the SRS 120. Descriptions of the blockchain network 116 is described further below.

In one configuration, the receiver 124 of the SRS 120 may receive the lock signal and/or the unlock signal. In response to the receiver 124 receiving the lock signal, the SRS 120 may secure the storage area 122 via the one or more cover mechanisms 126. Alternatively, or in addition to, in response to the receiver 124 receiving the unlock signal, the SRS 120 may release the one or more cover mechanisms 126 to enable access to the storage area 122. By one approach, the one or more cover mechanisms 126 may include a sliding structure, a pivoting structure, and/or other ways of covering, disabling access through, and/or securing the opening 128. In some embodiments, the SRS 120 may include a storage locker, kiosk, automatic storage and retrieval tower, and/or other holding and dispensing systems and/or devices used to hold, store, and/or stage items for delivery to customers. In one configuration, the SRS 120 may include a plurality of storage lockers. In one example, one or more of the plurality of storage lockers are associated, owned, and/or assigned to a particular customer. In another example, each of the plurality of storage lockers in the SRS 120 may be associated, owned, and/or assigned to a plurality of customers.

In some embodiments, the user device 104 may be paired with a vehicle 130 via a vehicle control system 132. By one approach, the pairing may enable the user interface product 102 to be communicatively coupled to the vehicle control system 132 via a second wireless network 134. In one example, the second wireless network 134 may include a local wireless network, a peer-to-peer network, and/or other type of networks that is configured to provide a local and/or secure communications between the user interface product 102 and the vehicle 130.

As further described below, the user interface product 102 is adapted to enhance decentralized biometric authentication through the blockchain network by ensuring that a user who requests access to the SRS 120, and/or particularly to the storage area 122, is a person with an authority to access, is an actual person authorized to access, and is a person about to access the SRS 120 and/or the storage area 122. The user may comprise of a customer, a delivery agent (e.g., an associate of a retailer, a third-party contractor, a crowd-source agent, etc.), maintenance agent, and/or other such authenticated person. Further, the user interface product 102, as described herein, may be implementable in a plurality of configurations. For example, in one configuration, the user interface product 102 may include the control circuit 106. In another configuration, the user interface product 102 may be distinct from the control circuit 106. In another configuration, the user interface product 102 may be distinct from the user device 104. In yet another configuration, the user device 104 may include the user interface product 102. In yet another configuration, the user device 104 may include the user interface product 102 and the control circuit 106. In yet another configuration, the control circuit 106 may be distinct from the user interface product 102 and the user device 104. In yet another configuration, the user interface product 102 may be embodied on the computer readable storage medium 114 and operable by the control circuit 106.

In an illustrative non-limiting example, a customer associated with the SRS 120 may receive a message (e.g., via the user device 104, personal computer, or the like) that an item has been delivered to the SRS 120. At a first time, the user interface product 102 may receive from the one or more biometric sensors 108 a first one or more biometric data of a user associated with the user device 104. In one configuration, a first time may include a period of time that starts when the user is within a proximate distance to the SRS 120 and ends when the user is within a threshold distance away from the SRS 120 and/or a period of time that corresponds to a day, an hour, and/or a span of hours and/or minutes when the user delivers, retrieves, and/or returns one or more items associated with an order.

By one approach, the one or more biometric sensors 108 may be triggered by the user interface product 102, in cooperation with the control device 106, to capture and/or provide the first one or more biometric data when the user device 104 is within a threshold distance from the SRS 120. In one example, the user interface product 102 and/or the control circuit 106 may determine whether the user device 104 is within the threshold distance from the SRS 120 based on a comparison of near real-time location data provided by the location sensor 110, the vehicle 130, or other device with a location data of the SRS 120 stored in at least one computer readable storage medium 114 or a remote memory. For example, a time corresponding to when the location sensor 110 provides the near real-time location data may be instantaneously or substantially be at the same time as when the one or more biometric sensors 108 provides the first one or more biometric data. In another example, the first one or more biometric data provided by the one or more biometric sensors 108 may include a captured one or more biometric data of the user and a time when the first one or more biometric data were captured. In another example, the control circuit 106 may record the time the one or more biometric sensors 108 captures the first one or more biometric data. As such, the user interface product 102 and/or the control device 106 may determine whether the time corresponding to the capturing of the one or more biometric data of the user and the time corresponding to the location sensor 110 determining the near real-time location data are within a first time and/or within a threshold of time predetermined by the user and/or the retailer.

By another approach, the one or more biometric data may be received by the control circuit 106 and stored temporarily in at least one computer readable storage medium 114, for example, a cache memory, when the user initiates use of the user device 104 while at the threshold distance from the SRS 120. In such an approach, an initiation of operation of the user interface product 102 (e.g., by the user) may trigger a receipt of the first one or more biometric data at the first time. By one approach, the user interface product 102 may trigger receipt of the near real-time location data. In one scenario, the receipt of the near real-time location data may be triggered by the receipt of the first one or more biometric data. In another scenario, the user interface product 102 may trigger receipt of the first one or more biometric data in response to a determination that the near real-time location data received from the at least one location sensor 110 is within the threshold distance from the SRS 120. In yet another scenario, the user interface product 102 may both receive the near real-time location data and the first one or more biometric data substantially at the same time when the user device 104 crosses a geofence of the SRS 120. In other words, the user interface product 102 and/or the user device 104 may detect the crossing of the geofence and triggers the receipt of the near real-time location data and the first one or more biometric data.

In such approaches, configurations, scenarios, and/or examples, the user interface product 102 may receive, at the first time, from at least one location sensor 110 the near real-time location data associated with the first one or more biometric data received from one or more biometric sensors 108. In an illustrative non-limiting example, when the user arrives at a location proximate to the SRS 120, the user may unlock the user device 104 that the user carries. Alternatively or in addition to, the user interface product 102 in cooperation with the control circuit 106 may prompt the user to unlock the user device 104 and/or operate on the user interface product 102 when the user device 104 is within the threshold distance from the SRS 120. In one example, the threshold distance may be selectively defined and/or updated by the user and/or a retailer associated with the order when the order is created and/or when the user initiates a transaction with the retailer.

In some embodiments, the user interface product 102 may receive, via the transceiver 112, from at least one computer server (not shown) coupled to the blockchain network 116 a token comprising a second one or more biometric data of the user. In one example, the second one or more biometric data may be provided by the user at the time the user initiated, during, and/or at the completion of an order. In another example, the second one or more biometric data may correspond to one or more stored biometric data of the user. In one configuration, at the start, at the completion, or at the submission of the order, the second one or more biometric data may be included with the token. As such, there are numerous ways to associate the user device 104 with the second one or more biometric data (e.g., stored biometric data) of the user. For example, the second one or more biometric data may be provided by the user through the user device 104 at the time the user initiated, during, and/or at the completion of an order using the user device 104. In another example, the second one or more biometric data along with an identifier associated with the user device 104 may be included with the token. In yet another example, the second one or more biometric data may be associated with the user device 104 based on a user profile associated with the user. In such examples, the identifier of the user device 104 associated with the second one or more biometric data may be compared with the identifier of the user device 104 associated with the first one or more biometric data (e.g., the near-real time biometric data obtained through the user device 104 when the user is at a threshold distance and/or at a threshold time away from the SRS 120 and/or the storage area 122) to determine whether the same user device 104 are associated with the first and second one or more biometric data.

By one approach, the token may correspond to a blockchain contract, transaction, bitcoin, or the like that includes information associated with an order initiated by the user. In one example, the information may include descriptions and/or identifiers associated with one or more items ordered and/or bought, delivery information, one or more delivery locations, one or more user profiles, information associated with the SRS 120 and/or the storage area 122 that is associated with the user (e.g., location data of the SRS 120 and/or the storage area 122), stored biometric data of the user and/or authorized user (e.g., the second one or more biometric data referred to in this application), one or more identifiers of the user device 104 that were used to capture the stored biometric data, and/or one or more identifiers of vehicles 130 associated with the user and/or authorized user and/or associated with one or more identifiers of the user device 104.

In one configuration, the user interface product 102 may determine cooperatively with the control circuit 106, at the first time, whether the first one or more biometric data matches within a threshold with the second one or more biometric data. In one scenario, the matching of the biometric data may include image processing and/or data processing of the first and second biometric data. As such, the user interface product 102 determines whether the user requesting access to the SRS 120 and/or the storage area 122 is an authorized user to access a particular storage area 122 of the SRS 120 based on the information included in the token. Further, the receipt of the token via the blockchain network 116 indicates to the user interface product 102 that the token and the information included in the token have not been tempered with, altered since the submission of the order, modified without permission of the user, and/or the like. By one approach, the threshold used to determine that there is a match is selectively defined and/or updated by the user and/or the retailer associated with the order. By one approach, the user interface product 102 may provide an alert message to the user device 104 in response to the first one or more biometric data not matching within the threshold with the second one or more biometric data. In one configuration, the alert message may be provided after one or more failed matching attempts of the biometric data. In such a configuration, for example, the user interface product 102 may provide a denial of access message to the user device 104 after the one or more failed matching attempts. As such, the user may notify the retailer of the failed attempts. Alternatively or in addition to, the user interface product 102 may notify the retailer of the failed attempts.

In another configuration, the user interface product 102 may determine cooperatively with the control circuit 106, at the first time, whether the first one or more biometric data and the second one or more biometric data are associated with the user device 104. As such, the user interface product 102 may determine that the user who provided the first one or more biometric data is the user requesting access and the user authorized to access the SRS 120 and/or the storage area 122. By one approach, the user interface product 102 in cooperation with the control circuit 106 may compare at least one identifier of the user device 104 that is associated with the second one or more biometric data included in the token with at least one identifier of the user device 104 that is associated with the first one or more biometric data provided by the one or more biometric sensors 108. In one example, the user interface product 102 may receive the at least one identifier of the user device 104 when the first one or more biometric data and/or the near real-time location data is received the first time.

In another configuration, the user interface product 102 may determine cooperatively with the control circuit 106, at the first time, whether the near real-time location data received from the at least one location sensor 110 is within the threshold distance from the SRS 120. As such, the user interface product 102 may determine that the user requesting access to the SRS 120 and/or the storage area 122 is the user at the location within the threshold distance from the SRS 120. By one approach, a geofence may be associated with the SRS 120 and that when the user device 104 is within the threshold distance from the SRS 120, the user interface product 102 may receive the near real-time location data of the user device 104 from the at least one location sensor 110. As previously described above, the threshold distance may be selectively defined and/or updated by the user and/or a retailer associated with the order.

In yet another configuration, the user interface product 102 may provide, at a first time via the transceiver 112, data associated with unlocking the SRS 120 based on the determination that: the first one or more biometric data matches within the threshold with the second one or more biometric data; the near real-time location data is within the threshold distance from the SRS 120; and the first one or more biometric data and the second one or more biometric data are associated with the user device 104. Thus, when the user interface product 102 has multiple confirmations indicating that the user requesting access to the SRS 120 and/or the storage area 122 is the authorized user, the user is proximate the SRS 120, and that the user is the authorized user based on the customer order, the user interface product 102 then unlocks the SRS 120 and/or the storage area 122. As such, accessing the SRS 120 and/or the storage area 122 is based on the multiple confirmations as described and/or a determination that the multiple confirmations is based on the user device 104 of the user. Thus, the customer may control delivery of and access to a delivered item via the use of the user interface product 102 operable on the user device 104 of the user who makes the delivery of the item (e.g., when the user is a delivery agent) or the user device 104 of the user who retrieves or returns the delivered item (e.g., when the user is the customer and/or the intended recipient).

In yet another configuration, the receiver 124 of the SRS 120 may receive the data associated with unlocking the SRS 120 and/or the storage area 122. In response, the SRS 120 may release the cover mechanism 126 to allow access to the storage area 122 through the one or more openings 128. By one approach, the data associated with unlocking the SRS 120 may be provided to the SRS 120 through the blockchain network 116, thereby validating authenticity of the unlocking data received by the SRS 120. Alternatively or in addition to, the data associated with unlocking the SRS 120 may be provided to the SRS 120 through the wireless network 118. In such a configuration, the SRS 120 may be configured to selectively accept communication with the user device 104 via the wireless network 118. In an illustrative non-limiting example, the SRS 120 may be configured to only pair with the user device 104. For example, the wireless network 118 may correspond to a Bluetooth wireless network. When the user is within the threshold distance from the SRS 120, the SRS 120 may recognize and initiate communication with the user device 104. Alternatively or in addition to, the user device 104 may initiate communication with the SRS 120 when the user device 104 is within the threshold distance from the SRS 120. On the other hand, when an unrecognized user device initiates communication with the SRS 120, the SRS 120 does not respond.

Alternatively or in addition to, in some embodiments, the user interface product 102 in cooperation with the control circuit 106 may determine one or more patterns of the user's daily route routine based on historical location data received over time from the at least one location sensor 110. In one configuration, the historical location data may comprise a compilation of location coordinates of places and/or areas the user device 104 had been over a period of time (e.g., one or more years, months, and/or days. As such, the user interface product 102 may determine a route taken by the user prior to arriving at a location within the threshold distance from the SRS 120. In one instance, the route may correspond to the route taken within a threshold of time immediately prior to arriving at the location. By one approach, the user interface product 102 may determine the route taken based on captured location data received from the at least one location sensor 110. In an illustrative non-limiting example, the user may habitually (e.g., substantially every weekday morning) go to a coffee shop a block from the user's house. In response, the user interface product 102 in cooperation with the control circuit 106 may recognize this routine as a pattern based on a number of times for a period of time the user device 104 has been at a particular sequence of location coordinates provided by the at least one location sensor 110. As such, by one approach, the user interface product 102 in cooperation with the control circuit 106 may initiate storing of the pattern in at least one computer readable storage medium 114. The stored pattern may be included in the historical location data. In some embodiments, the user interface product 102 in cooperation with the control circuit 106 may determine whether the route taken matches with the one or more patterns of the user's daily route routine. By one approach, in response to the determination of the match, the user interface product 102 may, alternatively or in addition to, provide data associated with unlocking the SRS 120.

In some embodiments, the user interface product 102 may determine cooperatively with the control circuit 106 whether the vehicle 130 is paired with the user device 104 at the first time when the vehicle 130 and the user device 104 is within the threshold distance from the SRS 120. As such, the pairing of the vehicle 130 with the user device 104 at the threshold distance from the SRS 120, provides another layer of authentication that indicates to the user interface product 102 that the user requesting access to the SRS 120 and/or the storage area 122 is an authorized user. In one configuration, the data associated with unlocking the SRS 120 may be provided by the user interface product 102 to the SRS 120 based at least in part on the determination that the vehicle 130 paired with the user device 104 is within the threshold distance from the SRS 120.

In yet some embodiments, the user interface product 102 may provide a second data associated with unlocking the SRS 120. By one approach, the second data may be provided to the SRS 120 via the wireless network 118, for example, a Bluetooth wireless network. In one configuration, the SRS 120 may release the cover mechanism 126 only after the receipt of the second data. In such a configuration, the token may further include a first identification data associated with the user device 104. The first identification data may correspond to one of the information previously described as being included in the token. By one approach, the user interface product 102 may determine a second identification data associated with the user device 104. In one example, the second identification data may correspond to one of the biometric data previously described. In such an approach, the user interface product 102 may prompt the user, via the user device 104, to provide the second identification data when the user device 104 is within the threshold distance from the SRS 120. In response, the user interface product 102 may determine cooperatively with the control circuit 106 whether the first identification data matches with the second identification data. The user interface product 102 may recognize a positive match when the match is within a threshold. In one configuration, the threshold may be predetermined by the user and/or the retailer prior to the user's submission of the order and/or the request for delivery. Alternatively or in addition to, in response to the positive match, the user interface product 102 may provide the second data indicating that the first identification data matches with the second identification data to the SRS 120. In response, the SRS 120 may release the cover mechanism 126 to allow access to the storage area 122.

Figure 2:
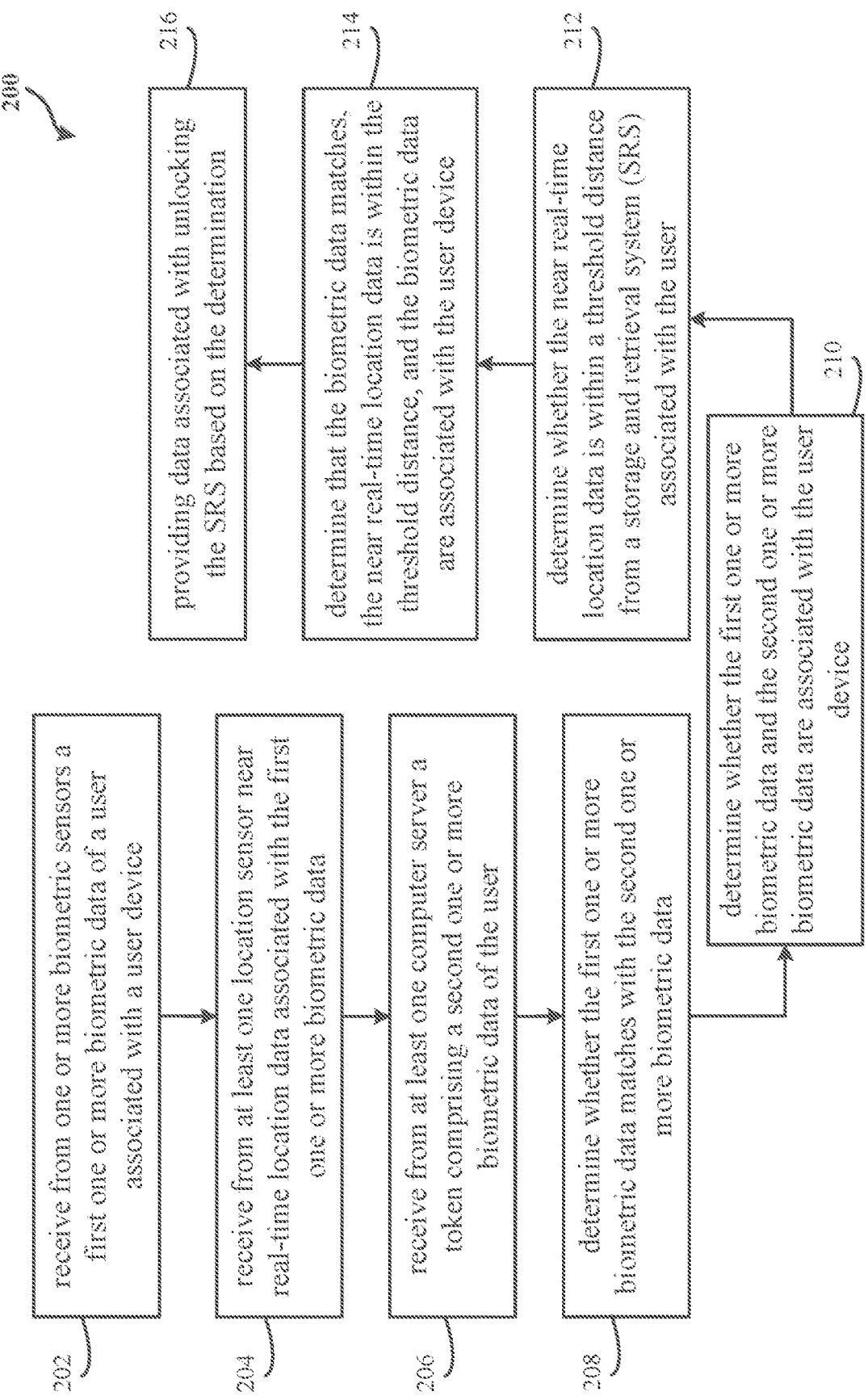
FIG. 2 shows a flow diagram of an exemplary process of securing access to storage and retrieval systems using decentralized biometric authentication data in accordance with some embodiments.

FIG. 2 illustrates a flow diagram of an exemplary method 200 for securing access to storage and retrieval systems using decentralized biometric authentication data. The exemplary method 200 may be implemented in the system 100 of FIG. 1. By one approach, one or more steps of the method 200 may be implemented by the user interface product 102, the control circuit 106 of FIG. 1, and/or the user device 104. By another approach, the user interface product 102, the computer readable storage medium 114, and the control circuit 106 may cooperatively operate to implement the method 200. The method 200 includes, at step 202, receiving from one or more biometric sensors a first one or more biometric data of a user associated with a user device. In one example, the user device may correspond to the user device 104 of FIG. 1. In one configuration, the method 200 may include, at step 204, receiving from at least one location sensor associated with the user device near real-time location data associated with the first one or more biometric data. By one approach, the method 200 may include receiving from at least one computer server coupled to a blockchain network a token comprising a second one or more biometric data of the user, at step 206. By another approach, the method 200 may include determining whether the first one or more biometric data matches with the second one or more biometric data, at step 208. In one configuration, the method 200 may include, at step 210, determining whether the first one or more biometric data and the second one or more biometric data are associated with the user device. In yet another configuration, the method 200 may include, at step 212, determining whether the near real-time location data received from the at least one location sensor is within a threshold distance from a storage and retrieval system (SRS) associated with the user. By one approach, the method 200 may include determining that the first one or more biometric data matches with the second one or more biometric data; the near real-time location data is within the threshold distance from the SRS; and the first one or more biometric data and the second one or more biometric data are associated with the user device, at step 214. By yet another approach, the method 200 may include, at step 216, providing data associated with unlocking the SRS based on the determination that the first one or more biometric data matches with the second one or more biometric data; the near real-time location data is within the threshold distance from the SRS; and the first one or more biometric data and the second one or more biometric data are associated with the user device.

Figure 3:
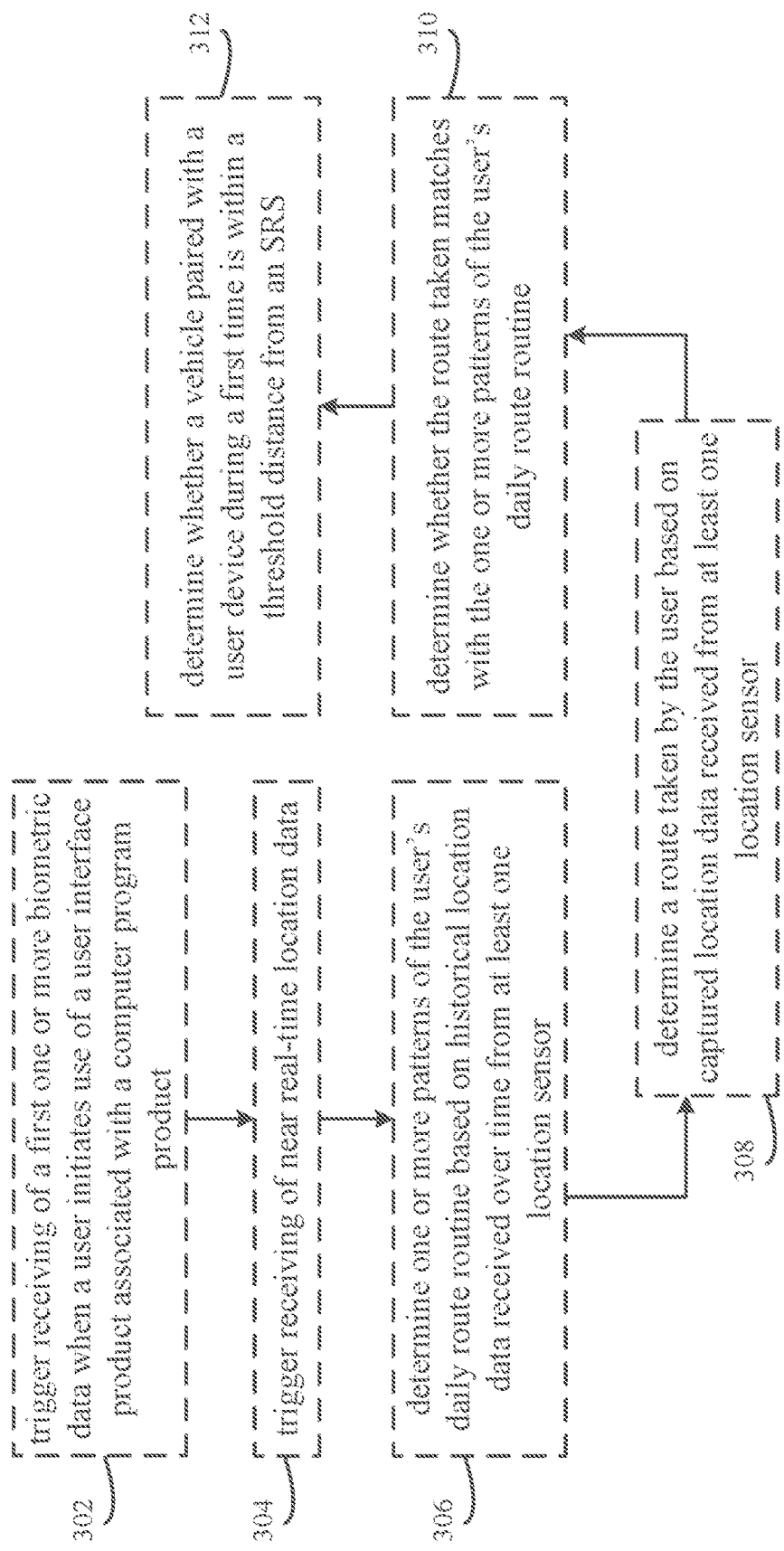
FIG. 3 shows a flow diagram of an exemplary process of securing access to storage and retrieval systems using decentralized biometric authentication data in accordance with some embodiments.

FIG. 3 illustrates a flow diagram of an exemplary method 300 for securing access to storage and retrieval systems using decentralized biometric authentication data. The exemplary method 300 may be implemented in in the system 100 of FIG. 1. By one approach, one or more steps of the method 300 may be implemented in at least one of the user interface product 102, the control circuit 106 of FIG. 1, and/or the user device 104. By another approach, the method 300 and/or one or more steps of the method may optionally be included in and/or performed in cooperation with the method 200 of FIG. 2. The method 300 includes, at step 302, triggering the receiving of the first one or more biometric data when the user initiates use of a user interface product associated with the computer program product. In one configuration, the method 300 may include triggering the receiving of the near real-time location data, at step 304. In another configuration, the method 300 may include, at step 306, determining one or more patterns of the user's daily route routine based on historical location data received over time from the at least one location sensor. By one approach, the method 300 may include, at step 308, determining a route taken by the user based on captured location data received from the at least one location sensor. By another approach, the method 300 may include determining whether the route taken matches with the one or more patterns of the user's daily route routine, at step 310. In one configuration, in response to the route taken being a match with the one or more patterns of the user's daily route routine, data associated with unlocking the SRS is provided to the SRS. By yet another approach, the method 300 may include, at step 312, determining whether a vehicle paired with the user device during a first time is within a threshold distance from the SRS. In one configuration, in response to the determination that the vehicle paired with the user device is within the threshold distance from the SRS, data associated with unlocking the SRS is provided to the SRS.

FIG. 4 illustrates a flow diagram of an exemplary method 400 for securing access to storage and retrieval systems using decentralized biometric authentication data. The exemplary method 400 may be implemented in in the system 100 of FIG. 1. By one approach, one or more steps of the method 400 may be implemented in at least one of the user interface product 102, the control circuit 106 of FIG. 1, and/or the user device 104. By another approach, the method 400 and/or one or more steps of the method may optionally be included in and/or performed in cooperation with the method 200 of FIG. 2 and/or the method 300 of FIG. 3. The method 400 includes, at step 402, determining a first identification data associated with the user device. By one approach, a second identification data associated with the user device may be include in a token received by the user device and/or a user interface product from a blockchain network. In one configuration, the method 400 may include, at step 404, determining cooperatively with a control circuit whether the first identification data matches with the second identification data. In yet another configuration, the method 400 may include providing to the SRS, via a transceiver and through the blockchain network, second data indicating that the first identification data matches with the second identification data, at step 406. In such a configuration, the second data associated with unlocking the SRS may be provided to the SRS through the blockchain network.

Figure 5:
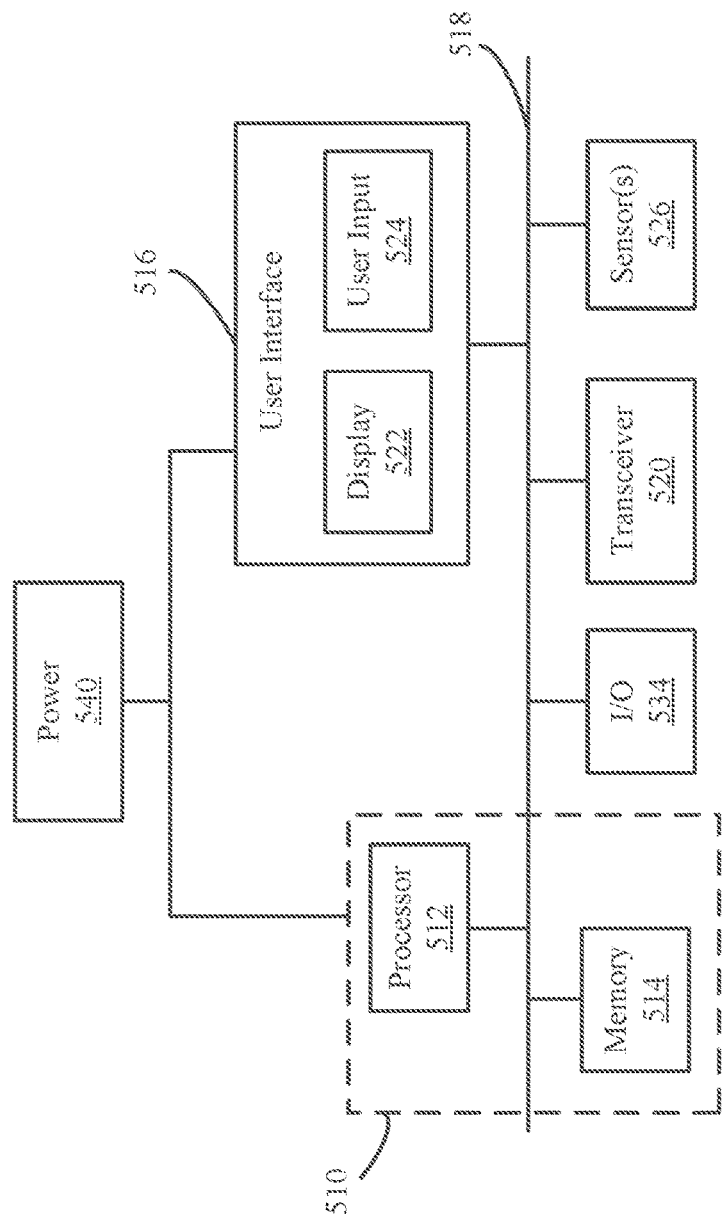
FIG. 5 illustrates an exemplary system for use in implementing methods, techniques, devices, apparatuses, systems, servers, sources and securing access to storage and retrieval systems using decentralized biometric authentication data, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 5 illustrates an exemplary system 500 that may be used for implementing any of the components, circuits, circuitry, systems, functionality, apparatuses, processes, or devices of the system 100 of FIG. 1, the method 200 of FIG. 2, the method 300 of FIG. 3, the method 400 of FIG. 4, and/or other above or below mentioned systems or devices, or parts of such circuits, circuitry, functionality, systems, apparatuses, processes, or devices. For example, the system 500 may be used to implement some or all of the system 100 for securing access to storage and retrieval systems using decentralized biometric authentication data through a blockchain network, the user interface product 102, the computer readable storage medium 114, the location sensors 110, the biometric sensors 108, the transceiver 112, the control circuit 106, the user device 104, the wireless network 118, the second wireless network 134, the blockchain network 116, the SRS 120, the receivers 124, the cover mechanism 126, the vehicle 130, the vehicle control system 132, and/or other such components, circuitry, functionality and/or devices. However, the use of the system 500 or any portion thereof is certainly not required.

By way of example, the system 500 may comprise a processor module (or a control circuit) 512, memory 514, and one or more communication links, paths, buses or the like 518. Some embodiments may include one or more user interfaces 516, and/or one or more internal and/or external power sources or supplies 540. The control circuit 512 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 512 can be part of control circuitry and/or a control system 510, which may be implemented through one or more processors with access to one or more memory 514 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 500 may be used to implement one or more of the above or below, or parts of, components, circuits, systems, processes and the like. For example, the system 500 may implement the system for securing access to storage and retrieval systems using decentralized biometric authentication data with the user interface product 102 and/or the control circuit 106 being the control circuit 512.

The user interface 516 can allow a user to interact with the system 500 and receive information through the system. In some instances, the user interface 516 includes a display 522 and/or one or more user inputs 524, such as buttons, touch screen, track ball, keyboard, mouse, etc., which can be part of or wired or wirelessly coupled with the system 500. Typically, the system 500 further includes one or more communication interfaces, ports, transceivers 520 and the like allowing the system 500 to communicate over a communication bus, a distributed computer and/or communication network (e.g., a local area network (LAN), the Internet, wide area network (WAN), etc.), communication link 518, other networks or communication channels with other devices and/or other such communications or combination of two or more of such communication methods. Further the transceiver 520 can be configured for wired, wireless, optical, fiber optical cable, satellite, or other such communication configurations or combinations of two or more of such communications. Some embodiments include one or more input/output (I/O) interface 534 that allow one or more devices to couple with the system 500. The I/O interface can be substantially any relevant port or combinations of ports, such as but not limited to USB, Ethernet, or other such ports. The I/O interface 534 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 526 to provide information to the system and/or sensor information that is communicated to another component, such as the user interface product, the control circuit, the user device, the computer readable storage medium, the SRS, the vehicle control system, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 500 comprises an example of a control and/or processor-based system with the control circuit 512. Again, the control circuit 512 can be implemented through one or more processors, controllers, central processing units, logic, software and the like. Further, in some implementations the control circuit 512 may provide multiprocessor functionality.

The memory 514, which can be accessed by the control circuit 512, typically includes one or more processor readable and/or computer readable media accessed by at least the control circuit 512, and can include volatile and/or nonvolatile media, such as RAM, ROM, EEPROM, flash memory and/or other memory technology. Further, the memory 514 is shown as internal to the control system 510; however, the memory 514 can be internal, external or a combination of internal and external memory. Similarly, some or all of the memory 514 can be internal, external or a combination of internal and external memory of the control circuit 512. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 514 can store code, software, executables, scripts, data, content, lists, programming, programs, log or history data, user information, customer information, product information, and the like. While FIG. 5 illustrates the various components being coupled together via a bus, it is understood that the various components may actually be coupled to the control circuit and/or one or more other components directly.

Descriptions of some embodiments of blockchain technology are provided with reference to FIG. 1-5 herein. In some embodiments of the invention described above, blockchain technology may be utilized to record customer orders and/or to secure access to storage and retrieval systems using decentralized biometric authentication data through a blockchain network. One or more of the system for securing access to storage and retrieval systems using decentralized biometric authentication data described herein may comprise a node in a distributed blockchain system storing a copy of the blockchain record. Updates to the blockchain may comprise transfer of items for delivery, customer orders for the items, transfer of chain of custody of the items, authentication to deliver and/or receive of the items and one or more nodes on the system may be configured to incorporate one or more updates into blocks to add to the distributed database.

Distributed database and shared ledger database generally refer to methods of peer-to-peer record keeping and authentication in which records are kept at multiple nodes in the peer-to-peer network instead of kept at a trusted party. A blockchain may generally refer to a distributed database that maintains a growing list of records in which each block contains a hash of some or all previous records in the chain to secure the record from tampering and unauthorized revision. A hash generally refers to a derivation of original data. In some embodiments, the hash in a block of a blockchain may comprise a cryptographic hash that is difficult to reverse and/or a hash table. Blocks in a blockchain may further be secured by a system involving one or more of a distributed timestamp server, cryptography, public/private key authentication and encryption, proof standard (e.g. proof-of-work, proof-of-stake, proof-of-space), and/or other security, consensus, and incentive features. In some embodiments, a block in a blockchain may comprise one or more of a data hash of the previous block, a timestamp, a cryptographic nonce, a proof standard, and a data descriptor to support the security and/or incentive features of the system.

In some embodiments, a blockchain system comprises a distributed timestamp server comprising a plurality of nodes configured to generate computational proof of record integrity and the chronological order of its use for content, trade, and/or as a currency of exchange through a peer-to-peer network. In some embodiments, when a blockchain is updated, a node in the distributed timestamp server system takes a hash of a block of items to be timestamped and broadcasts the hash to other nodes on the peer-to-peer network. The timestamp in the block serves to prove that the data existed at the time in order to get into the hash. In some embodiments, each block includes the previous timestamp in its hash, forming a chain, with each additional block reinforcing the ones before it. In some embodiments, the network of timestamp server nodes performs the following steps to add a block to a chain: 1) new activities are broadcasted to all nodes, 2) each node collects new activities into a block, 3) each node works on finding a difficult proof-of-work for its block, 4) when a node finds a proof-of-work, it broadcasts the block to all nodes, 5) nodes accept the block only if activities are authorized, and 6) nodes express their acceptance of the block by working on creating the next block in the chain, using the hash of the accepted block as the previous hash. In some embodiments, nodes may be configured to consider the longest chain to be the correct one and work on extending it. A digital currency implemented on a blockchain system is described by Satoshi Nakamoto in "Bitcoin: A Peer-to-Peer Electronic Cash System" (http://bitcoin.org/bitcoin.pdf), the entirety of which is incorporated herein by reference.

Figure 6:
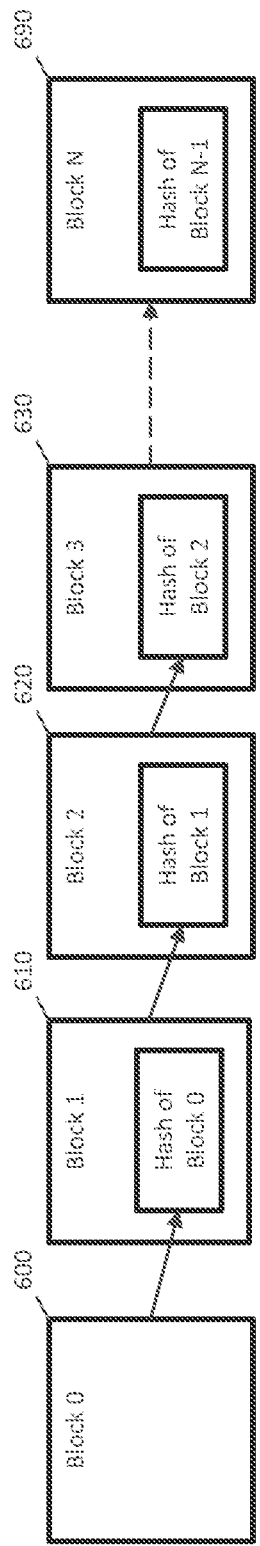
FIG. 6 comprises an illustration of blocks as configured in accordance with various embodiments of these teachings.

Now referring to FIG. 6, an illustration of a blockchain according to some embodiments is shown. In some embodiments, a blockchain comprises a hash chain or a hash tree in which each block added in the chain contains a hash of the previous block. In FIG. 6, block 0 600 represents a genesis block of the chain. Block 1 610 contains a hash of block 0 600, block 2 620 contains a hash of block 1 610, block 3 630 contains a hash of block 2 620, and so forth. Continuing down the chain, block N contains a hash of block N−1. In some embodiments, the hash may comprise the header of each block. Once a chain is formed, modifying or tampering with a block in the chain would cause detectable disparities between the blocks. For example, if block 1 is modified after being formed, block 1 would no longer match the hash of block 1 in block 2. If the hash of block 1 in block 2 is also modified in an attempt to cover up the change in block 1, block 2 would not then match with the hash of block 2 in block 3. In some embodiments, a proof standard (e.g. proof-of-work, proof-of-stake, proof-of-space, etc.) may be required by the system when a block is formed to increase the cost of generating or changing a block that could be authenticated by the consensus rules of the distributed system, making the tampering of records stored in a blockchain computationally costly and essentially impractical. In some embodiments, a blockchain may comprise a hash chain stored on multiple nodes as a distributed database and/or a shared ledger, such that modifications to any one copy of the chain would be detectable when the system attempts to achieve consensus prior to adding a new block to the chain. In some embodiments, a block may generally contain any type of data and record. In some embodiments, each block may comprise a plurality of transaction and/or activity records.

In some embodiments, blocks may contain rules and data for authorizing different types of actions and/or parties who can take action. In some embodiments, transaction and block forming rules may be part of the software algorithm on each node. When a new block is being formed, any node on the system can use the prior records in the blockchain to verify whether the requested action is authorized. For example, a block may contain a public key of an owner of an asset that allows the owner to show possession and/or transfer the asset using a private key. Nodes may verify that the owner is in possession of the asset and/or is authorized to transfer the asset based on prior transaction records when a block containing the transaction is being formed and/or verified. In some embodiments, rules themselves may be stored in the blockchain such that the rules are also resistant to tampering once created and hashed into a block. In some embodiments, the blockchain system may further include incentive features for nodes that provide resources to form blocks for the chain. For example, in the Bitcoin system, "miners" are nodes that compete to provide proof-of-work to form a new block, and the first successful miner of a new block earns Bitcoin currency in return.

Figure 7:
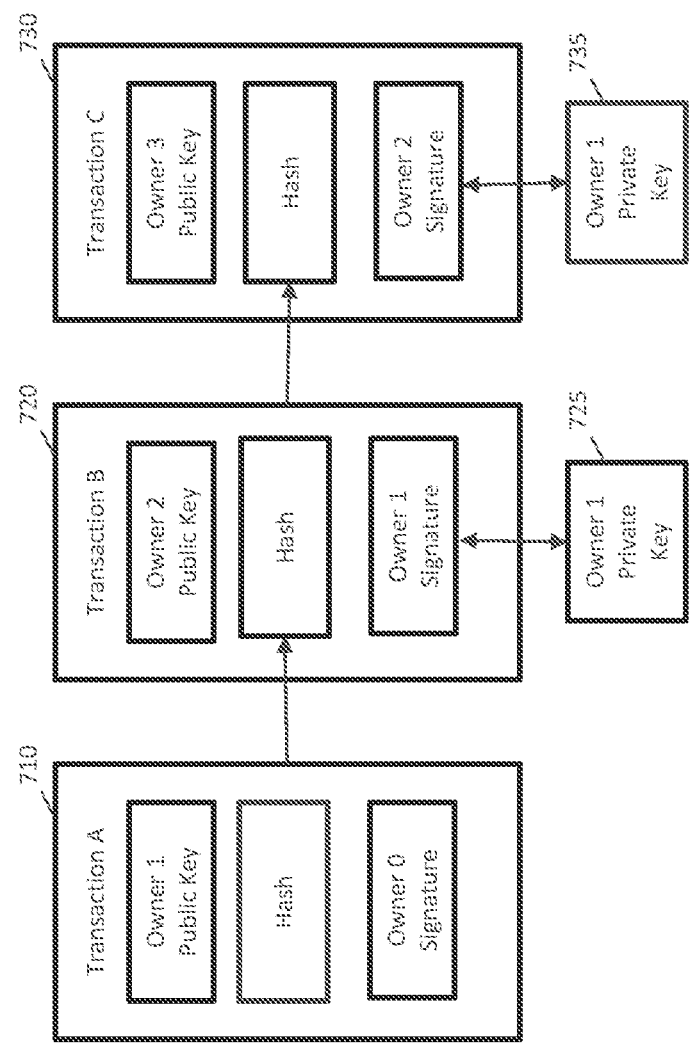
FIG. 7 comprises an illustration of transactions configured in accordance with various embodiments of these teachings.

Now referring to FIG. 7, an illustration of blockchain based transactions according to some embodiments is shown. In some embodiments, the blockchain illustrated in FIG. 7 comprises a hash chain protected by private/public key encryption. Transaction A 710 represents a transaction recorded in a block of a blockchain showing that owner 1 (recipient) obtained an asset from owner 0 (sender). Transaction A 710 contains owner's 1 public key and owner 0's signature for the transaction and a hash of a previous block. When owner 1 transfers the asset to owner 2, a block containing transaction B 720 is formed. The record of transaction B 720 comprises the public key of owner 2 (recipient), a hash of the previous block, and owner 1's signature for the transaction that is signed with the owner 1's private key 725 and verified using owner 1's public key in transaction A 710. When owner 2 transfers the asset to owner 3, a block containing transaction C 730 is formed. The record of transaction C 730 comprises the public key of owner 3 (recipient), a hash of the previous block, and owner 2's signature for the transaction that is signed by owner 2's private key 735 and verified using owner 2's public key from transaction B 720. In some embodiments, when each transaction record is created, the system may check previous transaction records and the current owner's private and public key signature to determine whether the transaction is valid. In some embodiments, transactions are be broadcasted in the peer-to-peer network and each node on the system may verify that the transaction is valid prior to adding the block containing the transaction to their copy of the blockchain. In some embodiments, nodes in the system may look for the longest chain in the system to determine the most up-to-date transaction record to prevent the current owner from double spending the asset. The transactions in FIG. 7 are shown as an example only. In some embodiments, a blockchain record and/or the software algorithm may comprise any type of rules that regulate who and how the chain may be extended. In some embodiments, the rules in a blockchain may comprise clauses of a smart contract that is enforced by the peer-to-peer network.

Figure 8:
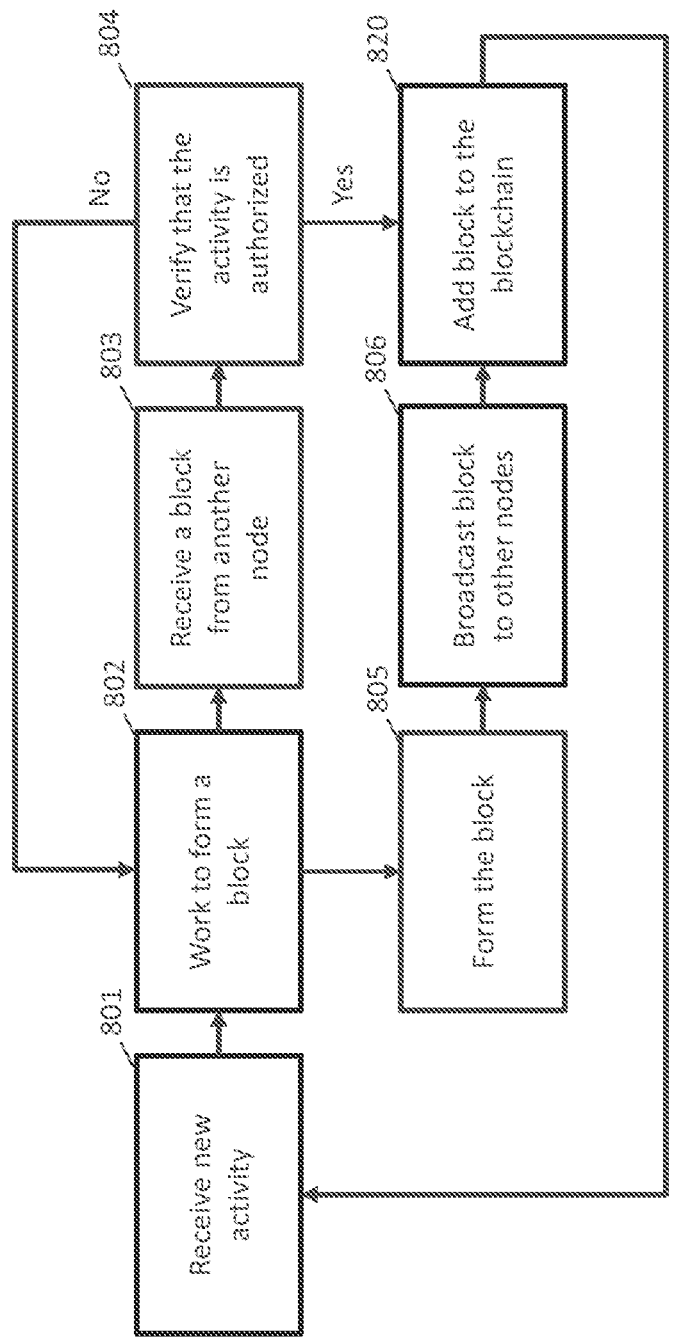
FIG. 8 comprises a flow diagram in accordance with various embodiments of these teachings.

Now referring to FIG. 8, a flow diagram according to some embodiments is shown. In some embodiments, the steps shown in FIG. 8 may be performed by a processor-based device, such as a computer system, a server, a distributed server, a timestamp server, a blockchain node, and the like. In some embodiments, the steps in FIG. 8 may be performed by one or more of the nodes in a system using blockchain for record keeping.

In step 801, a node receives a new activity. The new activity may comprise an update to the record being kept in the form of a blockchain. In some embodiments, for blockchain supported digital or physical asset record keeping, the new activity may comprise an asset transaction. In some embodiments, the new activity may be broadcasted to a plurality of nodes on the network prior to step 801. In step 802, the node works to form a block to update the blockchain. In some embodiments, a block may comprise a plurality of activities or updates and a hash of one or more previous block in the blockchain. In some embodiments, the system may comprise consensus rules for individual transactions and/or blocks and the node may work to form a block that conforms to the consensus rules of the system. In some embodiments, the consensus rules may be specified in the software program running on the node. For example, a node may be required to provide a proof standard (e.g. proof of work, proof of stake, etc.) which requires the node to solve a difficult mathematical problem for form a nonce in order to form a block. In some embodiments, the node may be configured to verify that the activity is authorized prior to working to form the block. In some embodiments, whether the activity is authorized may be determined based on records in the earlier blocks of the blockchain itself.

After step 802, if the node successfully forms a block in step 805 prior to receiving a block from another node, the node broadcasts the block to other nodes over the network in step 806. In some embodiments, in a system with incentive features, the first node to form a block may be permitted to add incentive payment to itself in the newly formed block. In step 820, the node then adds the block to its copy of the blockchain. In the event that the node receives a block formed by another node in step 803 prior to being able to form the block, the node works to verify that the activity recorded in the received block is authorized in step 804. In some embodiments, the node may further check the new block against system consensus rules for blocks and activities to verify whether the block is properly formed. If the new block is not authorized, the node may reject the block update and return to step 802 to continue to work to form the block. If the new block is verified by the node, the node may express its approval by adding the received block to its copy of the blockchain in step 820. After a block is added, the node then returns to step 801 to form the next block using the newly extended blockchain for the hash in the new block.

In some embodiments, in the event one or more blocks having the same block number is received after step 820, the node may verify the later arriving blocks and temporarily store these block if they pass verification. When a subsequent block is received from another node, the node may then use the subsequent block to determine which of the plurality of received blocks is the correct/consensus block for the blockchain system on the distributed database and update its copy of the blockchain accordingly. In some embodiments, if a node goes offline for a time period, the node may retrieve the longest chain in the distributed system, verify each new block added since it has been offline, and update its local copy of the blockchain prior to proceeding to step 801.

Figure 9:
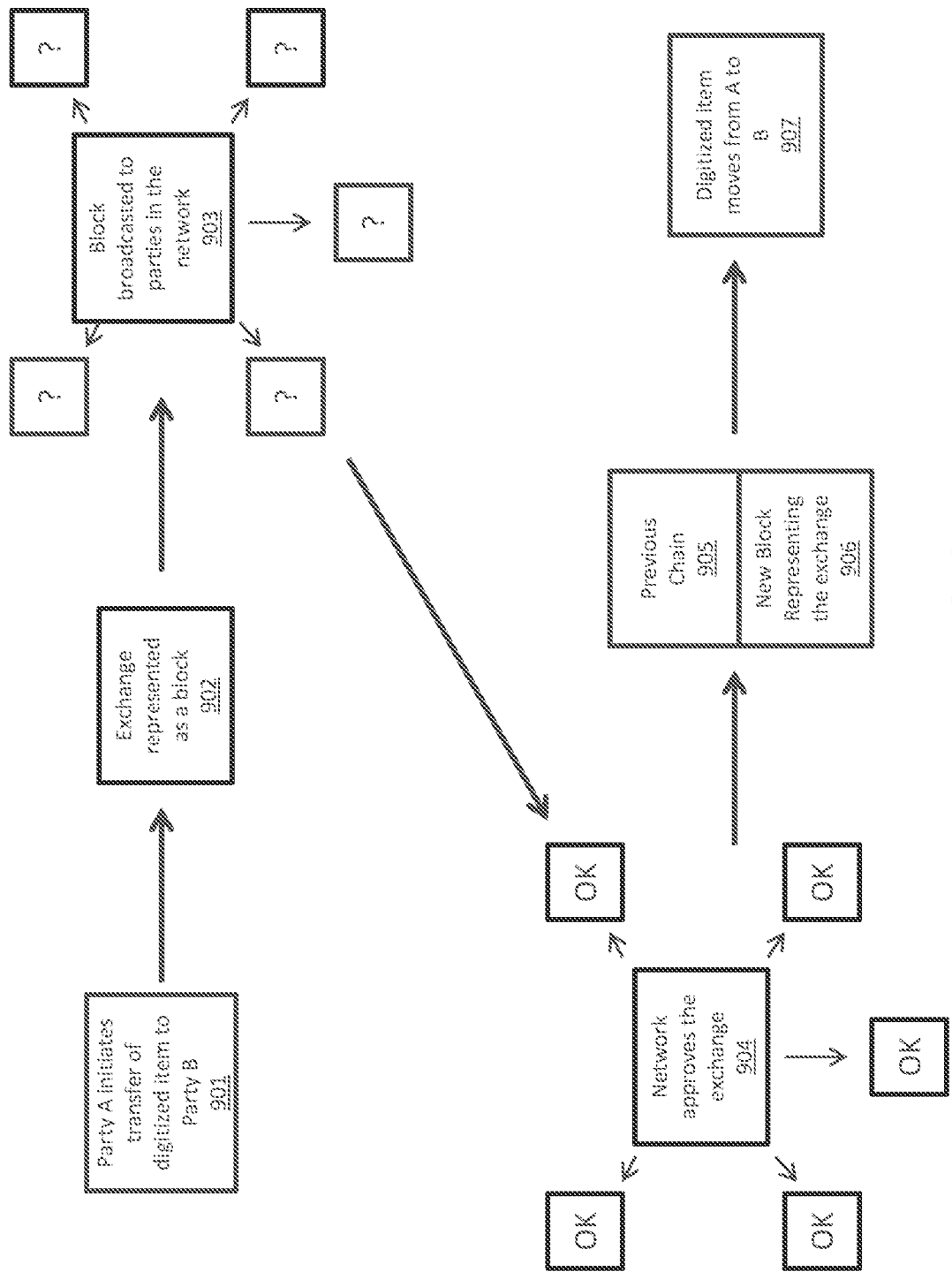
FIG. 9 comprises a process diagram as configured in accordance with various embodiments of these teachings.

Now referring to FIG. 9, a process diagram of a blockchain update according to some implementations is shown. In step 901, party A initiates the transfer of a digitized item to party B. In some embodiments, the digitized item may comprise a digital currency, a digital asset, a document, rights to a physical asset, etc. In some embodiments, Party A may prove that he has possession of the digitized item by signing the transaction with a private key that may be verified with a public key in the previous transaction of the digitized item. In step 902, the exchange initiated in step 901 is represented as a block. In some embodiments, the transaction may be compared with transaction records in the longest chain in the distributed system to verify part A's ownership. In some embodiments, a plurality of nodes in the network may compete to form the block containing the transaction record. In some embodiments, nodes may be required to satisfy proof-of-work by solving a difficult mathematical problem to form the block. In some embodiments, other methods of proof such as proof-of-stake, proof-of-space, etc. may be used in the system. In some embodiments, the node that is first to form the block may earn a reward for the task as incentive. For example, in the Bitcoin system, the first node to provide prove of work to for block the may earn a Bitcoin. In some embodiments, a block may comprise one or more transactions between different parties that are broadcasted to the nodes. In step 903, the block is broadcasted to parties in the network. In step 904, nodes in the network approve the exchange by examining the block that contains the exchange. In some embodiments, the nodes may check the solution provided as proof-of-work to approve the block. In some embodiments, the nodes may check the transaction against the transaction record in the longest blockchain in the system to verify that the transaction is valid (e.g. party A is in possession of the asset he/she s seeks to transfer). In some embodiments, a block may be approved with consensus of the nodes in the network. After a block is approved, the new block 906 representing the exchange is added to the existing chain 905 comprising blocks that chronologically precede the new block 906. The new block 906 may contain the transaction(s) and a hash of one or more blocks in the existing chain 905. In some embodiments, each node may then update their copy of the blockchain with the new block and continue to work on extending the chain with additional transactions. In step 907, when the chain is updated with the new block, the digitized item is moved from party A to party B.

Figure 10:
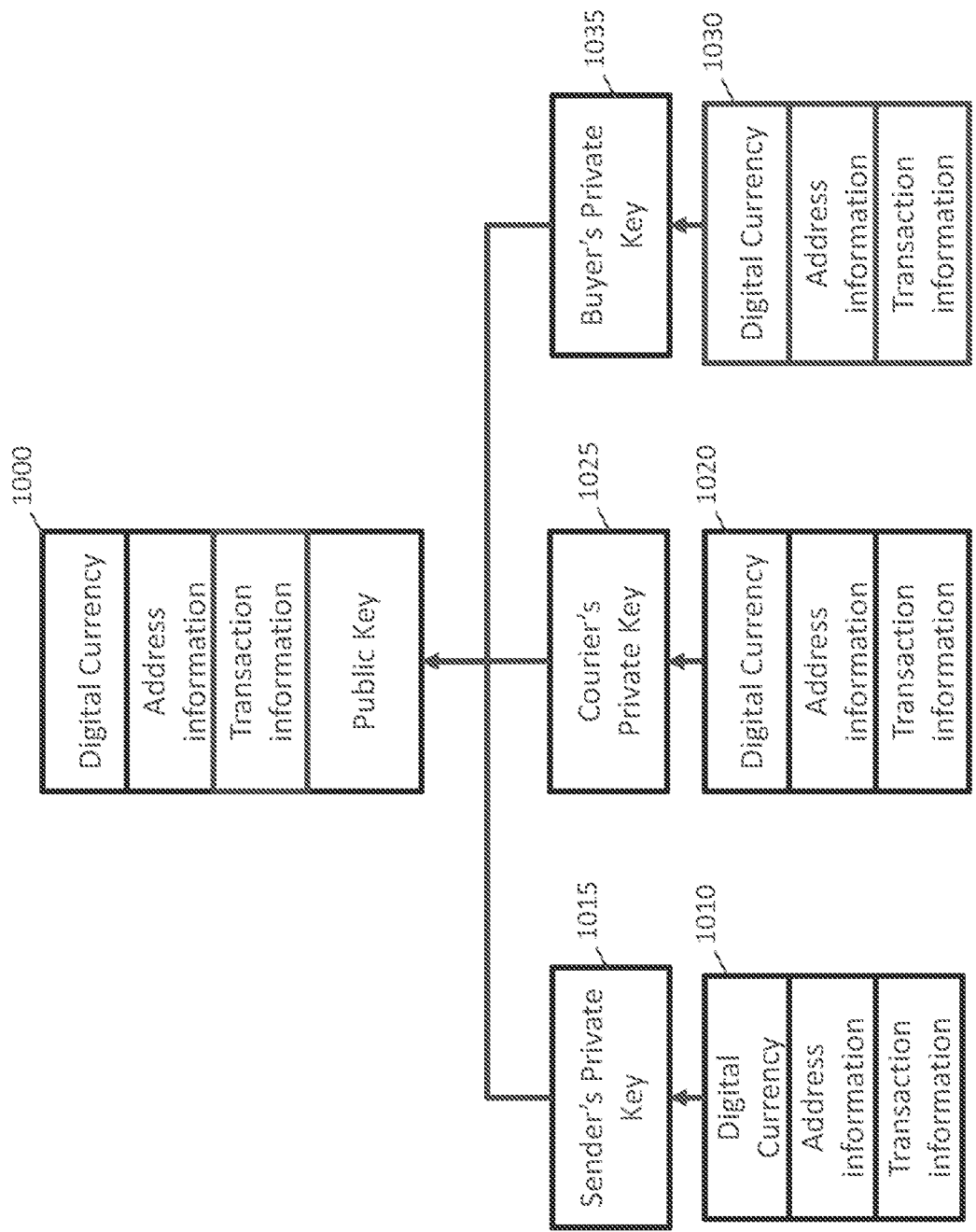
FIG. 10 comprises an illustration of a delivery record configured in accordance with various embodiments of these teachings.

Now referring to FIG. 10, a diagram of a blockchain according to some embodiments in shown. FIG. 10 comprises an example of an implementation of a blockchain system for delivery service record keeping. The delivery record 1000 comprises digital currency information, address information, transaction information, and a public key associated with one or more of a sender, a courier, and a buyer. In some embodiments, nodes associated the sender, the courier, and the buyer may each store a copy of the delivery record 1010, 1020, and 1030 respectively. In some embodiments, the delivery record 1000 comprises a public key that allows the sender, the courier, and/or the buyer to view and/or update the delivery record 1000 using their private keys 1015, 1025, and the 1035 respectively. For example, when a package is transferred from a sender to the courier, the sender may use the sender's private key 1015 to authorize the transfer of a digital asset representing the physical asset from the sender to the courier and update the delivery record with the new transaction. In some embodiments, the transfer from the seller to the courier may require signatures from both the sender and the courier using their respective private keys. The new transaction may be broadcasted and verified by the sender, the courier, the buyer, and/or other nodes on the system before being added to the distributed delivery record blockchain. When the package is transferred from the courier to the buyer, the courier may use the courier's private key 1025 to authorize the transfer of the digital asset representing the physical asset from the courier to the buyer and update the delivery record with the new transaction. In some embodiments, the transfer from the courier to the buyer may require signatures from both the courier and the buyer using their respective private keys. The new transaction may be broadcasted and verified by the sender, the courier, the buyer, and/or other nodes on the system before being added to the distributed delivery record blockchain.

With the scheme shown in FIG. 10, the delivery record may be updated by one or more of the sender, courier, and the buyer to form a record of the transaction without a trusted third party while preventing unauthorized modifications to the record. In some embodiments, the blockchain based transactions may further function to include transfers of digital currency with the completion of the transfer of physical asset. With the distributed database and peer-to-peer verification of a blockchain system, the sender, the courier, and the buyer can each have confidence in the authenticity and accuracy of the delivery record stored in the form of a blockchain.

Figure 11:
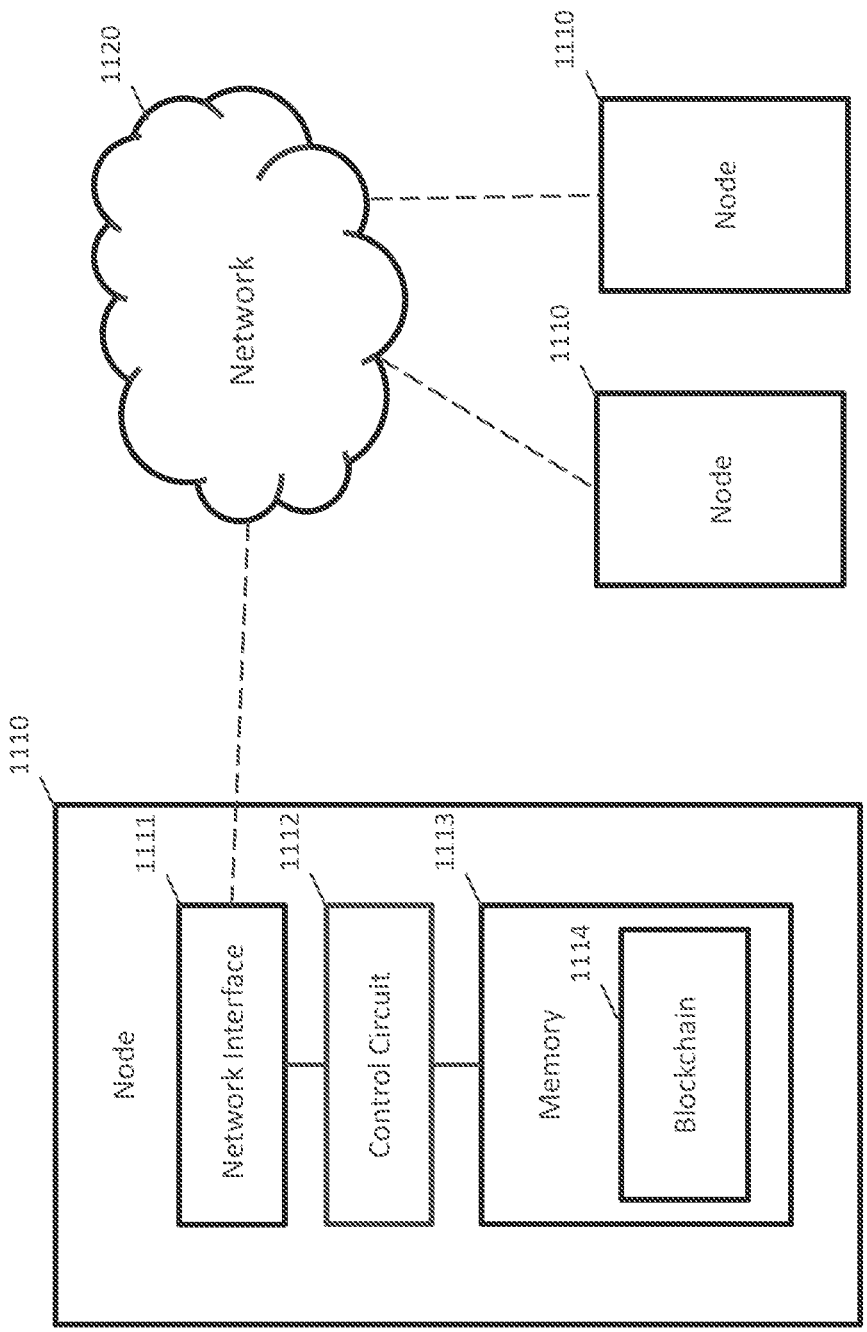
FIG. 11 comprise a system diagram configured in accordance with various embodiments of these teachings.

Now referring to FIG. 11, a system according to some embodiments is shown. A distributed blockchain system comprises a plurality of nodes 1110 communicating over a network 1120. In some embodiments, the nodes 1110 may be comprise a distributed blockchain server and/or a distributed timestamp server. In some embodiments, one or more nodes 1110 may comprise or be similar to a "miner" device on the Bitcoin network. Each node 1110 in the system comprises a network interface 1111, a control circuit 1112, and a memory 1113.

The control circuit 1112 may comprise a processor, a microprocessor, and the like and may be configured to execute computer readable instructions stored on a computer readable storage memory 1113. The computer readable storage memory may comprise volatile and/or nonvolatile memory and have stored upon it a set of computer readable instructions which, when executed by the control circuit 1112, causes the node 1110 update the blockchain 1114 stored in the memory 1113 based on communications with other nodes 1110 over the network 1120. In some embodiments, the control circuit 1112 may further be configured to extend the blockchain 1114 by processing updates to form new blocks for the blockchain 1114. Generally, each node may store a version of the blockchain 1114, and together, may form a distributed database. In some embodiments, each node 1110 may be configured to perform one or more steps described with reference to FIGS. 8-9 herein.

The network interface 1111 may comprise one or more network devices configured to allow the control circuit to receive and transmit information via the network 1120. In some embodiments, the network interface 1111 may comprise one or more of a network adapter, a modem, a router, a data port, a transceiver, and the like. The network 1120 may comprise a communication network configured to allow one or more nodes 1110 to exchange data. In some embodiments, the network 1120 may comprise one or more of the Internet, a local area network, a private network, a virtual private network, a home network, a wired network, a wireless network, and the like. In some embodiments, the system does not include a central server and/or a trusted third party system. Each node in the system may enter and leave the network at any time.

With the system and processes shown in, once a block is formed, the block cannot be changed without redoing the work to satisfy census rules thereby securing the block from tampering. A malicious attacker would need to provide proof standard for each block subsequent to the one he/she seeks to modify, race all other nodes, and overtake the majority of the system to affect change to an earlier record in the blockchain.

In some embodiments, blockchain may be used to support a payment system based on cryptographic proof instead of trust, allowing any two willing parties to transact directly with each other without the need for a trusted third party. Bitcoin is an example of a blockchain backed currency. A blockchain system uses a peer-to-peer distributed timestamp server to generate computational proof of the chronological order of transactions. Generally, a blockchain system is secure as long as honest nodes collectively control more processing power than any cooperating group of attacker nodes. With a blockchain, the transaction records are computationally impractical to reverse. As such, sellers are protected from fraud and buyers are protected by the routine escrow mechanism.

In some embodiments, a blockchain may use to secure digital documents such as digital cash, intellectual property, private financial data, chain of title to one or more rights, real property, digital wallet, digital representation of rights including, for example, a license to intellectual property, digital representation of a contractual relationship, medical records, security clearance rights, background check information, passwords, access control information for physical and/or virtual space, and combinations of one of more of the foregoing that allows online interactions directly between two parties without going through an intermediary. With a blockchain, a trusted third party is not required to prevent fraud. In some embodiments, a blockchain may include peer-to-peer network timestamped records of actions such as accessing documents, changing documents, copying documents, saving documents, moving documents, or other activities through which the digital content is used for its content, as an item for trade, or as an item for remuneration by hashing them into an ongoing chain of hash-based proof-of-work to form a record that cannot be changed in accord with that timestamp without redoing the proof-of-work.

In some embodiments, in the peer-to-peer network, the longest chain proves the sequence of events witnessed, proves that it came from the largest pool of processing power, and that the integrity of the document has been maintained. In some embodiments, the network for supporting blockchain based record keeping requires minimal structure. In some embodiments, messages for updating the record are broadcast on a best-effort basis. Nodes can leave and rejoin the network at will and may be configured to accept the longest proof-of-work chain as proof of what happened while they were away.

In some embodiments, a blockchain based system allows content use, content exchange, and the use of content for remuneration based on cryptographic proof instead of trust, allowing any two willing parties to employ the content without the need to trust each other and without the need for a trusted third party. In some embodiments, a blockchain may be used to ensure that a digital document was not altered after a given timestamp, that alterations made can be followed to a traceable point of origin, that only people with authorized keys can access the document, that the document itself is the original and cannot be duplicated, that where duplication is allowed and the integrity of the copy is maintained along with the original, that the document creator was authorized to create the document, and/or that the document holder was authorized to transfer, alter, or otherwise act on the document.

As used herein, in some embodiments, the term blockchain may refer to one or more of a hash chain, a hash tree, a distributed database, and a distributed ledger. In some embodiments, blockchain may further refer to systems that uses one or more of cryptography, private/public key encryption, proof standard, distributed timestamp server, and inventive schemes to regulate how new blocks may be added to the chain. In some embodiments, blockchain may refer to the technology that underlies the Bitcoin system, a "sidechain" that uses the Bitcoin system for authentication and/or verification, or an alternative blockchain ("altchain") that is based on bitcoin concept and/or code but are generally independent of the Bitcoin system.

Descriptions of embodiments of blockchain technology are provided herein as illustrations and examples only. The concepts of the blockchain system may be variously modified and adapted for different applications Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for securing access to storage and retrieval systems using decentralized biometric authentication data through a blockchain network comprising:
    a user device coupled to a blockchain network and comprising one or more biometric sensors, at least one location sensor, a transceiver, and a control circuit operatively coupled to the user interface product, the user device configured to receive a first one or more biometric data from a user at one time and a second one or more biometric data of the user at another time via the one or more biometric sensors;
    a user interface product operable on the user device and cooperatively coupled with the control circuit, wherein the user interface product is adapted to enhance decentralized biometric authentication through the blockchain network by being configured to:
        receive, at a first time, from the one or more biometric sensors the first one or more biometric data of the user associated with the user device;
        receive, at the first time, from the at least one location sensor near real-time location data associated with the first one or more biometric data;
        receive, via the transceiver, from at least one computer server coupled to the blockchain network a token comprising the second one or more biometric data of the user;
        determine cooperatively with the control circuit, at the first time, whether the first one or more biometric data matches within a threshold with the second one or more biometric data;
        determine cooperatively with the control circuit, at the first time, whether the first one or more biometric data and the second one or more biometric data were both provided by the user via the same user device;
        determine cooperatively with the control circuit of the user device, at the first time, whether the near real-time location data received from the at least one location sensor of the user device is within a threshold distance from a storage and retrieval system (SRS) associated with the user; and
        provide, at the first time via the transceiver, unlock data to unlock the SRS based on the determination that:
            the first one or more biometric data matches within the threshold with the second one or more biometric data;
            the near real-time location data is within the threshold distance from the SRS; and
            the first one or more biometric data and the second one or more biometric data were both provided by the user using the same user device; and
    the SRS operatively coupled to the user device, the SRS comprising an opening to a storage area adapted to receive one or more items for delivery, a cover mechanism to prevent access to the opening, and a receiver configured to receive the unlock data to unlock the SRS via a release of the cover mechanism.

2. The system of claim 1, wherein the unlock data to unlock the SRS is provided to the SRS through the blockchain network thereby validating authenticity of the unlock data received by the SRS.

3. The system of claim 1, wherein the unlock data to unlock the SRS is provided to the SRS through a wireless network.

4. The system of claim 3, wherein the wireless network comprises a Bluetooth wireless network.

5. The system of claim 1, wherein the first one or more biometric data and the second one or more biometric data comprise at least one of the user's particular stride posture, gait, subconscious movements, and mannerism.

6. The system of claim 1, wherein the user interface product is further configured to:
    trigger, at the first time, the receipt of the first one or more biometric data when the user initiates use of the user interface product; and
    trigger, at the first time, the receipt of the near real-time location data.

7. The system of claim 1, wherein the user interface product is further configured to:
    determine cooperatively with the control circuit one or more patterns of the user's daily route routine based on historical location data received over time from the at least one location sensor;
    determine cooperatively with the control circuit a route taken by the user prior to the first time at same day based on captured location data received, prior to the first time at the same day, from the at least one location sensor; and determine cooperatively with the control circuit whether the route taken matches with the one or more patterns of the user's daily route routine, wherein the provided data associated with unlocking the SRS is further based on the determination that the route taken matches with the one or more patterns of the user's daily route routine.

8. The system of claim 1, wherein the user interface product is further configured to:

determine cooperatively with the control circuit whether a vehicle paired with the user device during the first time is within a threshold distance from the SRS, wherein the provided unlock data to unlock the SRS is further based on the determination that the vehicle paired with the user device is within the threshold distance from the SRS.

9. The system of claim 1, wherein the user interface product is further configured to trigger, at the first time, the receipt of the first one or more biometric data in response to the determination that the near real-time location data received from the at least one location sensor is within the threshold distance from the SRS.

10. The system of claim 1, wherein the token further comprises a first identification data associated with the user device, wherein the user interface product is further configured to:

determine, at the first time, a second identification data associated with the user device;

determine cooperatively with the control circuit, at the first time, whether the first identification data matches with the second identification data; and provide, at the first time via the transceiver, second data indicating that the first identification data matches with the second identification data to the SRS, and wherein the release of the cover mechanism of the SRS is in response to the receipt of the unlock data to unlock the SRS and the second data.

11. The system of claim 10, wherein the data associated with unlocking the SRS and the second data are provided to the SRS through Bluetooth wireless network.

12. A computer program product embodied on a non-transitory computer readable storage medium for enhancing decentralized biometric authentication through a blockchain network comprising:

computer code for receiving from one or more biometric sensors of a user device a first one or more biometric data of a user associated with the user device, the user device includes the computer readable storage medium;

computer code for receiving from at least one location sensor of the user device near real-time location data associated with the first one or more biometric data;

computer code for receiving from at least one computer server coupled to a blockchain network a token comprising a second one or more biometric data of the user, where the second one or more biometric data of the user was received from the one or more biometric sensors of the user device at another time distinct from a time the first one or more biometric data of the user was received from the one or more biometric sensors of the user device;

computer code for determining whether the first one or more biometric data matches with the second one or more biometric data;

computer code for determining whether the first one or more biometric data and the second one or more biometric data were both provided by the user using the same user device;

computer code for determining whether the near real-time location data received from the at least one location sensor of the user device is within a threshold distance from a storage and retrieval system (SRS) associated with the user;

computer code for determining that:
the first one or more biometric data matches with the second one or more biometric data;
the near real-time location data is within the threshold distance from the SRS; and
the first one or more biometric data and the second one or more biometric data were both provided by the user via the same user device; and computer code for providing unlock data to unlock the SRS based on the determination that:
the first one or more biometric data matches with the second one or more biometric data;
the near real-time location data is within the threshold distance from the SRS; and
the first one or more biometric data and the second one or more biometric data are associated with the user device.

13. The computer program product of claim 12, wherein the first one or more biometric data and the second one or more biometric data comprise at least one of the user's particular stride posture, gait, subconscious movements, and mannerism.

14. The computer program product of claim 12, wherein the unlock data to unlock the SRS is provided to the SRS through the blockchain network.

15. The computer program product of claim 12, wherein the unlock data to unlock the SRS is provided to the SRS through a wireless network.

16. The computer program product of claim 15, wherein the wireless network comprises a Bluetooth wireless network.

17. The computer program product of claim 12, further comprising:

computer code for triggering the receiving of the first one or more biometric data when the user initiates use of a user interface product associated with the computer program product; and computer code for triggering the receiving of the near real-time location data.

18. The computer program product of claim 12, further comprising:

computer code for determining one or more patterns of the user's daily route routine based on historical location data received over time from the at least one location sensor;

computer code for determining a route taken by the user based on captured location data received from the at least one location sensor; and computer code for determining whether the route taken matches with the one or more patterns of the user's daily route routine, wherein the provided unlock data to unlock the SRS is further based on the determination that the route taken matches with the one or more patterns of the user's daily route routine.

19. The computer program product of claim 12, further comprising computer code for determining whether a vehicle paired with the user device during a first time is within a threshold distance from the SRS, wherein the provided unlock data to unlock the SRS is further based on the determination that the vehicle paired with the user device is within the threshold distance from the SRS.

20. The computer program product of claim 12, further comprising:
- computer code for determining a first identification data associated with the user device, wherein the token further comprises a second identification data associated with the user device;
- computer code for determining cooperatively with a control circuit whether the first identification data matches with the second identification data; and
- computer code for providing to the SRS, via a transceiver and through the blockchain network, second data indicating that the first identification data matches with the second identification data, wherein the second data is provided to the SRS through the blockchain network in addition to the unlock data.

\* \* \* \* \*